United States Patent [19]
Miller

[11] 3,893,112
[45] July 1, 1975

[54] COMPUTER FOR THRESHOLD OF TAU

[75] Inventor: Jeffrey Ellis Miller, Dallas, Tex.

[73] Assignee: RCA Corporation, New York, N.Y.

[22] Filed: Jan. 21, 1974

[21] Appl. No.: 434,925

[52] U.S. Cl........... 343/6.5 LC; 324/186; 343/5 DP; 343/112 CA; 235/92 T
[51] Int. Cl............................................. G01s 9/56
[58] Field of Search...... 343/112 CA, 5 DP, 6.5 LC, 343/6.8 LC, 112 C; 324/186

[56] References Cited
UNITED STATES PATENTS

| | | | |
|---|---|---|---|
| 3,167,772 | 1/1965 | Bagnall, Jr. et al. | 343/112 CA |
| 3,582,626 | 6/1971 | Stansbury | 343/112 CA |
| 3,697,986 | 10/1972 | Colby | 343/112 CA |
| 3,714,648 | 1/1973 | Bennett et al. | 343/112 CA |
| 3,757,339 | 9/1973 | Shear | 343/112 CA |

*Primary Examiner*—Maynard R. Wilbur
*Assistant Examiner*—G. E. Montone
*Attorney, Agent, or Firm*—Edward J. Norton; Joseph D. Lazar; Michael A. Lechter

[57] ABSTRACT

A system for comparing with a preset constant a ratio of the average value of a variable to the average value of its time derivative over a specified time interval. The system is embodied in a digital circuit, consisting of counters and logic gates, performing both an averaging function and a ratio comparison function without requiring division by a variable. One embodiment of the system finds particular utility in the field of collision avoidance of airborne vehicles wherein it can be used to give early warning of a potential collision by comparing the time to impact, Tau, (range over range rate) to a preset critical time.

11 Claims, 5 Drawing Figures

FIG. 1

COMPUTER FOR THRESHOLD OF TAU

CROSS REFERENCES TO RELATED APPLICATIONS

Of interest are the following copending applications: Ser. No. 269,536, entitled "Digital Tracker," now U.S. Pat. No. 3,803,604, based on the invention of Bernard Case; Ser. No. 269,535, entitled "Digital Range Rate Computer" now U.S. Pat. No. 3,803,602 and Ser. No. 269,538, entitled "Track Gate Movement Limiter," now U.S. Pat. No. 3,803,605 both based on the inventions of Bernard Case and Jeffrey Miller, all filed on July 7, 1972, and assigned to the same assignee as the assignee of the present invention.

BACKGROUND OF THE INVENTION

1. Field of the Invention

The present invention relates to logic systems for comparing a preset constant with a ratio of the average value of a variable to the average value of its time derivative (over the same time interval), and in particular, to a provision in a collision avoidance system for comparing the time to impact, Tau (range over range rate) to a preset critical time, and responsively generating a warning.

2. Description of the Prior Art

The present invention is concerned with generating a warning at an interrogating station when the time to possible impact, Tau, with a remote station is less than a chosen threshold value.

Time to impact, Tau, is a well known parameter in collision avoidance systems. Digital prior art systems have provided means for generating a Tau warning by dividing the two variables range and range rate, then comparing the resultant quotient of the ratio to a preset threshold value. However, implementation of such a division by those two variables utilizing digital logic appears to require extensive hardware.

Some prior art systems have circumvented the implementation of the required division of the two variables needed for Tau by analog or electro-mechanical systems in which a Tau limit warning, rather than Tau itself, is provided by visual indications or by enabling a range gate that excludes all but critically defined Tau's. Examples of such systems are described in U.S. Pat. Nos. 3,035,261, issued May 15, 1962; 3,114,145, issued Dec. 10, 1963 and 3,697,987, issued Oct. 10, 1972. Such prior art systems, however, are not compatible with digital systems.

A need therefore exists for a digital Tau warning system that can be easily implemented.

DETAILED DESCRIPTION OF PREFERRED EMBODIMENTS

The present invention is concerned with, in particular, an improvement in a digital tracking system disclosed and claimed in the above-identified copending patent application, Ser. No. 269,536 of Bernard Case, now U.S. Pat. No. 3,803,604. Briefly, the copending application describes a digital tracker used in RCA's SECANT collision avoidance system, wherein the time to impact, Tau, is digitally computed. The average range between an interrogating station and a remote station is logically divided by the average rate of change of that range. More specifically, RCA's SECANT, as embodied in said application, accomplishes this computation, in essence, in the following manner. A tracking interval, defined preferably by a specified number of transmitted interrogation pulses, in the order of 250 to 750 pulses, is divided into a plurality of contiguous sampling periods, preferably three. Clock pulses, (hereinafter termed range counts), each representative of a predetermined distance, are generated by clock means within the tracker. Means within the tracker passes the range counts only during the time intervals between the transmission of an interrogation pulse and the reception of the corresponding reply from the remote station. The range counts generated during the time interval between the interrogation pulse and reply pulse, hence passed by the range count gating means, are hereinafter termed "interrogation-reply gated" range counts. The number of interrogation-reply gated range counts associated with a particular interrogation pulse is therefore a measure of the range between the interrogating and remote stations for that particular sample. The relationship in time of the range counts (RC), interrogation pulse ($T_o$), corresponding reply pulse ($T_{Reply}$) and gated range counts are shown in lines RC, $T_o$, $T_{Reply}$, and r respectively of FIG. 2.

The range parameter is determined by accumulating, in a counter, the interrogation-reply gated range counts generated during the entire tracking interval. Thus, at the end of the tracking interval, the contents of the counter represent the sum of the specified number of range samples taken during the tracking interval. The average range over the tracking interval is determined by dividing the contents of the counter by an appropriate constant, dependent upon the number of samples taken, that is, the number of interrogation pulses defining the tracking interval, and a suitable conversion factor between the range counts and actual physical distance.

The range rate parameter is determined by incrementing (up-counting) an up/down counter in accordance with the number of interrogation-reply gated range counts generated during the first sampling period, holding the up/down counter idle (inhibited) during the second sampling period, then decrementing (down-counting) the up/down counter in accordance with the number of interrogation-reply gated range counts generated during the third sampling period. Thus, at the end of the tracking interval the contents of the up/down counter represent the difference between the sum of the range samples taken during the first sampling period and the sum of the range samples taken during the third sampling period. The average range rate over the tracking interval is then determined by dividing the contents of the up/down counter by an appropriate constant dependent upon the number of samples defining the sampling periods, the conversion factor between the range counts and the physical rate of change of the range and the known time duration of the tracking interval.

The time to impact (Tau) is then determined by dividing the average range over the interval by the average range rate. The computed value of Tau is then compared to a predetermined preset critical threshold value and the system accordingly generates a warning if the computed value of Tau is less than the preset threshold value.

The above-described system, however, requires extensive hardware to implement the separate computing, averaging and division of the two range and range rate variables. In addition, the above system requires separate accumulators or counters for each variable.

The present invention provides for a means to generate a warning signal when Tau is less than a specific threshold and may be implemented with only a single accumulator or counter for both range and range rate. Further, the present invention provides means for both the averaging function and ratio comparison with only a single step of division by a preset constant rather than a division of two variables.

The principle of the present invention depends upon implementing the determination of a predetermined value of Tau rather than determining Tau in an absolute sense. Briefly, this is accomplished by rearranging the well-known expression for the calculation of Tau.

Tau ($\tau$) is usually expressed as:

$$\tau = \frac{\text{Range}}{\text{Range Rate}} = \frac{R}{\frac{\Delta R}{\Delta t}}$$

Where R is the range or physical distance between the interrogating and remote stations and $\Delta t$ is the time interval during which a change in range ($\Delta R$) occurs.

Assuming a tracking interval of a predetermined number of transmitted interrogation pulses, and dividing such tracking interval into a plurality of sampling periods at least two of which are of equal duration, equation (1) can be expressed in terms of a representative electrical signal, $r$, manifesting the interrogation-reply gated range counts discussed above:

$$\tau = \frac{(r_a + r_b + r_c)\frac{1}{K_1}}{(r_a - r_c)\frac{1}{K_2}} \qquad (2)$$

where $r_a$, $r_b$ and $r_c$ represent the number of gated range counts generated during three sampling periods $a$, $b$ and $c$ respectively, periods $a$ and $c$ being of equal duration; and $K_1$ and $K_2$ are conversion constants respectively relating the representative electrical signal $r$ (range counts) to the actual average range and range rate.

The present invention provides means to generate a signal when the time to possible impact, $\tau$, is less than or equal to a specified critical threshold, $\tau_{crit}$. This threshold or warning signal may be represented by the equation:

$$\tau = (r_a + r_b + r_c)/K_1/(r_a - r_c)/K_2 \leq \tau_{crit} \qquad (3)$$

which may be equivalently expressed as;

$$(r_a + r_b + r_c)\frac{K_2}{K_1 \times \tau_{crit}} + r_c - r_a \leq 0 \qquad (4)$$

$$\text{Letting } N = \frac{K_1 \times \tau_{crit}}{K_2} \qquad (4a)$$

Equation (4) can be expressed as;

$$\frac{r_a - r_c - (r_a + r_b + r_c)}{N} \geq 0 \qquad (5)$$

It should be noted that the relationship expressed by equation (5) involves a division only by the constant N into the variable parameters $r_a$, $r_b$, and $r_c$, and a simple comparison of $r_a$ with $r_c + (r_a + r_b + r_c)/N$. According to the invention the critical threshold for Tau is preset by the choice of $\tau_{crit}$ in the equation for N and a warning signal is provided for any such critical relationship that is manifested by a tracker utilizing this invention, as will be understood from the following detailed description of an embodiment of the invention.

Figure 1:
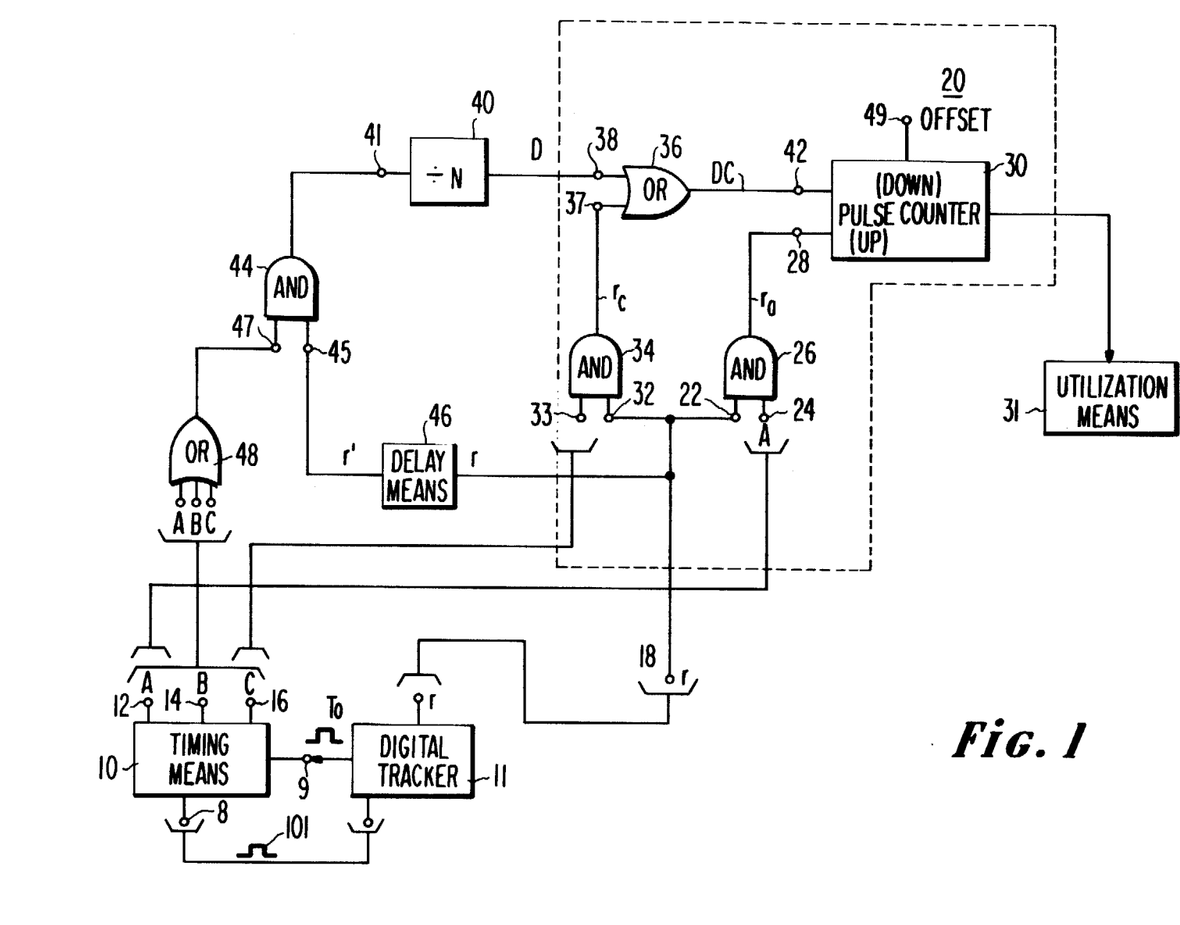
FIG. 1 is a block diagram of one embodiment of the present invention.
Figure 2:
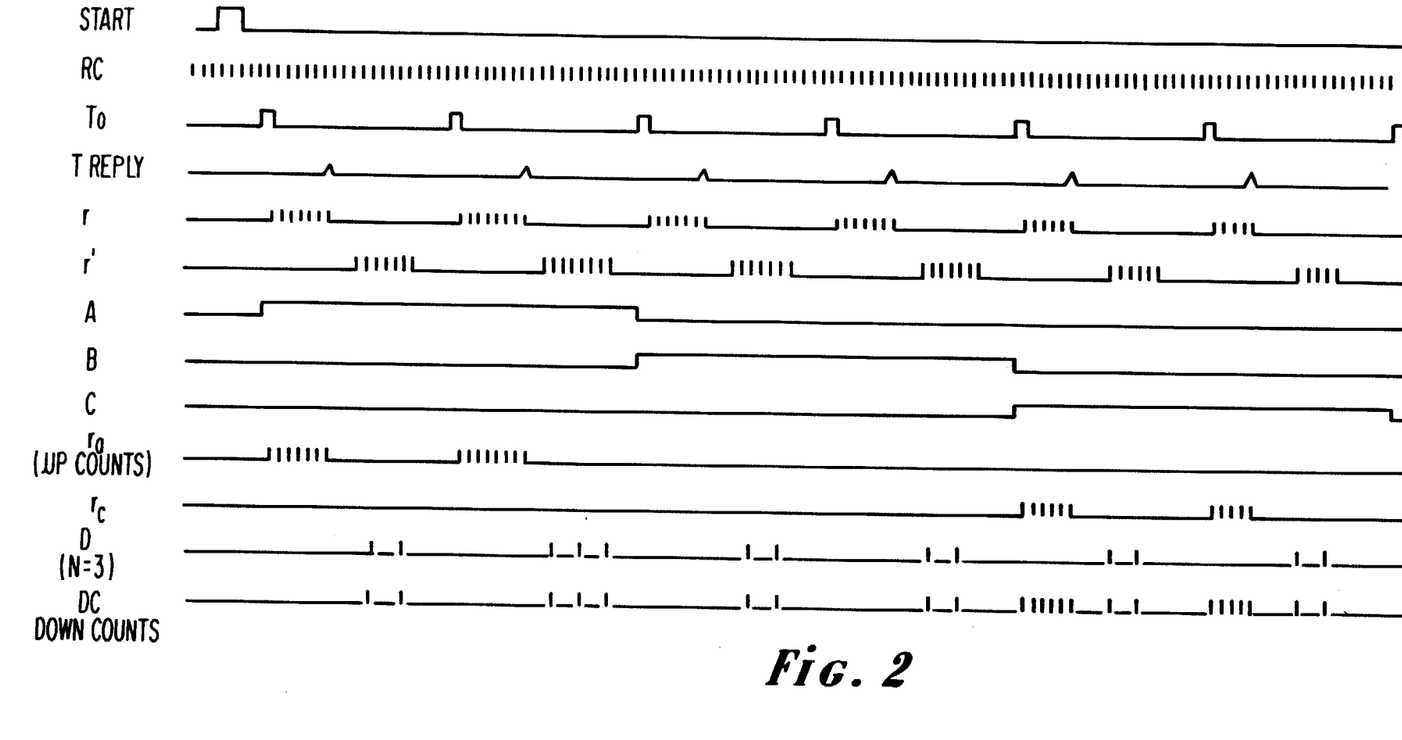
FIG. 2 is a graphical illustration of the relative timing of the various signals employed by the embodiment of the present invention illustrated by FIG. 1.

FIG. 1 is a block diagram illustrating an implementation of equation (5) according to the invention; while FIG. 2 is a graph showing the time relationships of the various electrical signals utilized in and provided by the system.

Operation of the Tau warning apparatus of the invention is initiated upon application of a suitable start pulse 101 to terminal 8, of a timing means 10. Start pulse 101 can also be utilized to preset pulse counter 30. The start pulse 101 is provided, for example, by a tracker 11, indicative of the control signal by the tracker calling for a Tau comparison. Timing means 10, thereafter receives pulses from tracker 11 (generally indicated as $T_a$) at terminal 9, each pulse corresponding to the transmission of an interrogation pulse by the tracker 11. A suitable tracker is described in the above-identified co-pending application, Ser. No. 269,536, filed July 7, 1972, assigned to the same assignee as the present application. The start pulse, 101, interrogative pulses $T_a$, and range counts ($r$) required for the present invention are provided by such a tracker. Other trackers known in the radar art may be used to provide the required input signals for a system embodying the present invention as will be apparent to those skilled in the art.

Timing means 10 is arranged to generate from its output terminals 12, 14, and 16 a plurality of control timing signals A, B and C, respectively, indicative of and defining the aforementioned contiguous sampling periods $a$, $b$ and $c$. It should be appreciated that any plurality of sampling periods may be utilized in the system provided that the duration of period $a$ is equal to that of period $c$.

The gated range counts (generally indicated as $r$), discussed above and illustrated on line $r$ of FIG. 2, are applied to input means such as input terminal 18.

Gated range counts, $r$, received at terminal 18 are applied to accumulator means 20, which is formed of first, second and third gate means 26, 34 and 36, respectively, and pulse counter means 30, having increment 28 and decrement 42 input terminals for adding and subtracting, respectively, one to the count in counter 30 for each input signal received. More specifically, the range counts $r$ (via terminal 18) and timing signal A are applied to the respective inputs 22 and 24 of first (AND) gate means 26. AND gate 26 produces an output signal $r_a$ for each input signal $r$ received during the first period, as illustrated on line $r_a$ "upcount" in FIG. 2. Output signals $r_a$ from AND gate 26 are applied to the increment terminal 28 of pulse counter means 30. Each range count r as applied to terminal 18 together with timing signal C from timing means 10 are applied to the respective inputs 32 and 33 of the second gate means 34 embodied here by a two input AND gate. AND gate 34 produces an output signal $r_c$ for each input signal $r$ received during sample period $c$. Third gate means 36, such as a two input OR gate, receives at one input terminal 37 output signals $r_c$ from AND gate 34 and at the other input terminal 38 the output signals D of an N divider 40. The output signals, DC, of OR gate 36, produced in response to any input signal, as illustrated on line DC (down counts) in FIG. 2, are applied to the decrement input terminal 42 of pulse counter means 30. The output of counter 30 is coupled to a suitable utilization means 31 as will be explained.

Divider 40 receives at its input terminal 41 the output signals of a two input AND gate 44, which in turn receives at its respective input terminals 45 and 47 a signal $r'$ which are derived from range counts r as received at terminal 18, suitably delayed for a time interval greater than the maximum target, but less than the next interrogation pulse $T_o$ as by delay means 46, and the output signals of a three input OR gate 48. OR gate 48 respectively receives at its input terminals timing signals A, B and C from timing means 10. Thus, AND gate 44 produces an output signal, applied to the input terminal 41 of divider means 40, for each input signal $r'$ received during the tracking interval comprising the sampling periods $a$, $b$ and $c$.

Divider 40 produces one output signal D for every group or accumulations of N input signals received, where N is a preset constant as defined in equation 4a, signals D being shown on line D of FIG. 2 with N taken, for the sake of simplicity, as 3. It should be noted that 3 is an atypical value for N, and that N in FIG. 2 is assigned the value 3 solely for purposes of illustration. A more typical value in practice for N is 470 for a $\tau_{crit.}$ of 40 seconds and a $T_o$ pulse repetition frequency of 971 cps.

The operation of the embodiment of FIG. 1 will now be explained in conjunction with the timing diagram of FIG. 2. A suitable start signal 101 initiates the tracker 11 and the timing means 10 to provide to the Tau computer the requisite input signals and initiate thereby pulse counter 30 to its starting position. Range counts RC each representative of range increments, are generated by clock means of the digital tracker 11 and are gated therefrom as pulses r only during the time intervals between the generation of interrogation or probe $T_o$ pulses, and the reception of a corresponding reply, $T_{reply}$, from the transponding or remote station. Start pulse 101 from the tracker causes the timing means 10 to become receptive to $T_o$ pulses, and accordingly generate logical timing signals A, B and C indicative of the sampling periods $a$, $b$ and $c$.

Timing signal A enables AND gate 26 with respect to those counts generated during period $a$, that is, to pass signal $r_a$. Thus, interrogation-reply gated range counts r, generated during sampling period $a$ increment pulse counter 30 for each $r_a$ pulse.

Similarly, the logical timing signal C, enables AND gate 34 with respect to r counts generated during period $c$ and thereby provides signal $r_c$. Thus, the $r_c$ counts are passed through AND gate 34 and OR gate 36 as signal DC to decrement pulse counter 30.

In order to ensure that the divider output signals D, to be explained, are not concurrent with any of the range counts, r, as applied to terminal 18, range counts, r, are delayed by suitable delay means 46, thus providing a delayed signal $r'$.

Each of logical timing signals A, B and C enables OR gate 48, in turn enabling AND gate 44 in response to all the delayed range counts, $r'$, generated during the tracking interval. Thus, all the $r'$ counts generated during the tracking interval are applied to and divided by divider 40.

Divider 40 generates one output pulse D for each group of N $r'$ counts, and thereby, through OR gate 36, pulse counter 30 is decremented by pulses DC once for every N $r'$ counts.

At the end of the tracking period the contents of pulse counter 30 represent the difference between the number of range counts (RC) generated during sampling period a and the sum of the total number of range counts (RC) generated during the tracking internal divided by the preset number N and the number of the range counts (RC) generated during period $c$. A positive difference indicates that $\tau$ is less than the preset threshold value $\tau_{crit.}$, (i.e. that inequality (5) is satisfied) and that a warning should be generated.

Figures 3, 4:
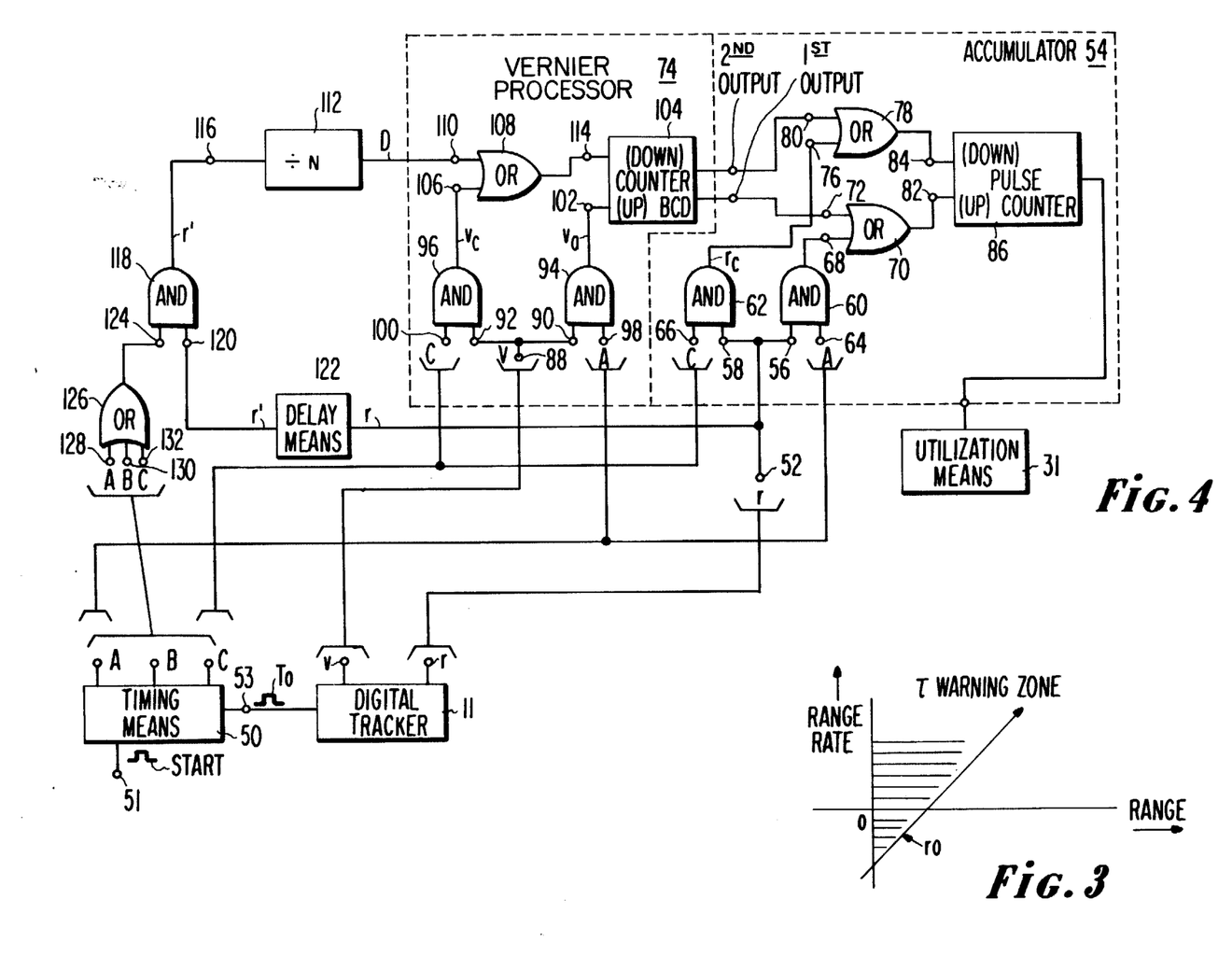
FIG. 3 is a graphical illustration of a fixed range offset.
FIG. 4 is a diagram of another embodiment of the present invention for use in a collision avoidance system and having vernier means for increasing the resolution of the system.

For certain conditions it is desirable to preset a predetermined value of range to "offset" the actual Tau calculation by such a value. This condition is useful when a Tau warning is desired for close target with a slow closing or opening range rate. To achieve this preset condition, according to the invention, the desired fixed range offset, designated $r_o$ may be provided by presetting pulse counter 30 through offset terminal 49. The preset number is determined by dividing the desired preset range by $K_1$ and presetting counter 30 to the calculated number of counts above zero in accordance with start pulse 101. A graph showing the range of adjustment and the resultant Tau warning zone is depicted in FIG. 3.

Another embodiment of the invention will be described following a background discussion relating to the problems of resolution. In a digital tracker such as that disclosed and claimed in the aforementioned copending application to Bernard Case, it is sometimes desirable to increase the resolution of the system without requiring faster clock means within the tracker, whereby each range count represents a lesser or smaller range distance. A preferred method of producing vernier pulses, each representing a fraction of the set distance represented by each range count, is described in said application of Bernard Case, whereby a time interval, in the order of five range counts, directly preceeding and ending with the centroid of the corresponding reply pulse in each range sample is "stretched" by a factor, suitably 10. Thus, 50 vernier counts will resolve the "time" interval which was previously resolved only by five range counts.

Figure 5:
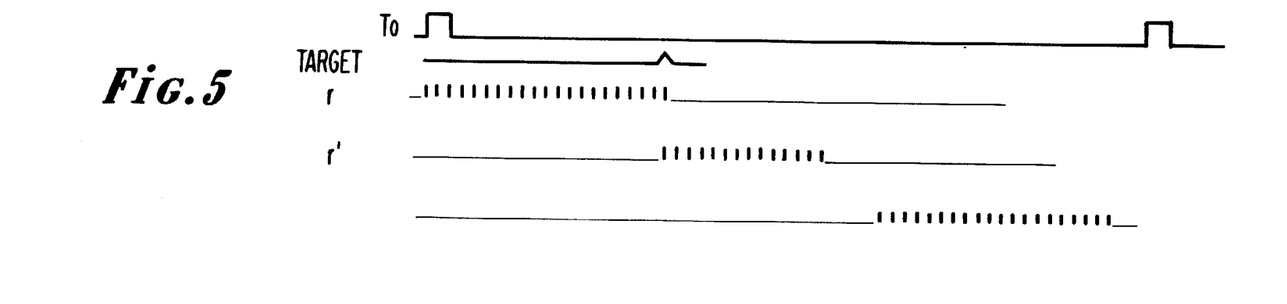
FIG. 5 is a timing diagram for one typical range sample with vernier.

The vernier pulses (assuming the same frequency as the range counts) are then each representative of 1/10 the distance represented by the range counts. A timing diagram for one typical range sample with vernier is shown in FIG. 5. Tau for such purposes can be defined in terms of range counts ($r_a$, $r_b$, $r_c$), vernier pulses ($V_a$, $V_c$), and conversion constants, ($K_1$, $K_2$) as;

$$\tau = \frac{\text{range}}{\text{range rate}} = \frac{(r_a+r_b+r_c)\frac{1}{K_1}}{\left(r_a+\frac{V_a}{10}\right) - \left(r_c+\frac{V_c}{10}\right)\frac{1}{K_2}} \quad (6)$$

From equation (6) it will be appreciated and understood that a warning should be generated when $$\tau = \frac{(r_a+r_b+r_c)\frac{1}{K_1}}{\left[\left(r_a+\frac{V_a}{10}\right) - \left(r_c+\frac{V_c}{10}\right)\right]\frac{1}{K_2}} \leq \tau_{crit.} \quad (7)$$

Equivalently stated as $$(r_a+r_b+r_c)\frac{K_2}{K_1}\tau_{crit.} - \left(r_a+\frac{V_a}{10}\right) + r_c + \frac{V_c}{10} \leq 0 \quad (8)$$

Letting $N = \frac{K_1 \tau_{crit.}}{10 K_2}$ (9)

Equation (8) can be equivalently stated:

$$r_a + \frac{V_a}{10} - (r_a+r_b+r_c)\frac{1}{10 N} - \left(r_c+\frac{V_c}{10}\right) \geq 0 \quad (10)$$

or $$r_a - r_c + \left[V_a - V_c - (r_a+r_b+r_c)\frac{1}{N}\right]\frac{1}{10} \geq 0 \quad (11)$$

A second embodiment of the present invention for use in a digital tracker provides for vernier processing means to increase the resolution of a tracker is shown in FIG. 4 based, in part, on the relationship just expressed by equation (11).

As previously described, means within digital tracker 11 produce $T_o$ pulses, interrogation-reply gated range counts $r$, and vernier pulses, $v$. Timing means 50, after receiving a start pulse at terminal 51 is conditioned to become receptive to $T_o$ pulses at terminal 53 (conveniently received from tracker 11) and accordingly generates a plurality of timing signals, A, B and C indicative of contiguous tracking sampling periods $a$, $b$ and $c$. It should be appreciated that any plurality of sampling periods can be utilized and that three periods are chosen to simplify the description for this embodiment.

Range counts $r$ are applied to the computer input such as terminal 52. Terminal 52 is electrically connected to accumulator 54, comprising first (AND gate 60), second (AND gate 62), third (OR gate 70) and fourth (OR gate 78) gate means and pulse counter means 86 having an Up (increment) 82 and a Down (decrement) 84 input terminal for adding and subtracting, respectively, a count of one for each input signal received to the count therein contained previous to each such signal. More specifically, the gated range counts $r$ are received at terminal 52 and are applied simultaneously to first input terminals 56 and 58 of both the first and second gate means 60 and 62, respectively. Timing signal A from timer 50 is applied to second input terminal 64 of AND gate 60. Thus, AND gate 60 produces an output signal for each gated range count $r$ received during sampling period $a$. Timing signal C is applied to second input terminal 66 of AND gate 62 whereby AND gate 62 generates an output signal for each gated range count $r$ received during sampling period $c$.

Output signals $r_a$ from AND gate 60 are applied to one input terminal 68 of the third gate means 70, a two input OR gate. OR gate 70, has applied to its second input terminal 72, a first output signal (hereinafter termed "vernier up count") from a vernier processing means 74.

The output signals $r_c$ of AND gate 62 are applied to one input terminal 76 of fourth gate means 78, a two input OR gate, which has applied at its second input terminal 80, a second output signal (hereinafter termed "vernier down count") from vernier processing means 74. The output signals of OR gates 70 and 78, generated in response to any input signal, are, respectively, applied to the Up (increment) 82 and Down (decrement) 84 input terminals of pulse counter means 86. Thus, the pulse counter 86 is up counted once for every gated range count $r$ received during sampling period $a$ and once for every vernier up count, and is down counted once for each vernier down count.

Vernier processing means 74 comprises a first 94, second 96 and third 108 gate means and pulse counter means 104 having an increment 102 and a decrement 114 input terminal, which produces a first output signal upon the positive direction transition of its contents from the highest state to zero, i.e., carries and produces a second output signal when upon negative direction transition of its contents from zero to its highest state, i.e. borrows. Vernier pulses are applied through an input terminal 88 from tracker 11, to first input terminals 90 and 92 of the first and second gate means 94 and 96, two input AND gates, respectively.

AND gates 94 and 96 have applied to their second input terminals 98 and 100 timing signals A and C, respectively. Thus, AND gate 94 produces an output signal $V_a$ for each vernier pulse V received during sampling period $a$ while AND gate 96 produces an output signal $V_c$ for each vernier pulse V received during sampling period $c$.

The output signals $V_a$ of AND gate 94 are applied to increment terminal 102 of pulse counter means 104, suitably a conventional BCD counter. The output signals $V_c$ of AND gate 96 are applied to one input terminal 106 of the third gate means 108, a two input OR gate, the other input terminal 110 of which receiving output signals D of N-divider 112.

The output signals of OR gate 108, generated in response to every input signal thereto, are applied to decrement input terminal 114 of BCD counter 104.

Divider 112 receives at its input terminal 116 the output signals of two input AND gate 118, which has applied at its first terminal 120 delayed range counts $r'$ produced by delay means 122 in response to the interrogation-reply gated range counts r as received at terminal 52 from tracker 11. The delay is greater than the maximum target distance. The second input terminal 124 of AND gate 118 has applied the output signal of three input OR gate 126. OR gate 126, respectively receives at its input terminals 128, 130 and 132 timing signals A, B and C. Thus AND gate 118 supplies divider 112 with an input signal in response to every delayed interrogation-reply gated range count $r'$.

In the operation of the embodiment illustrated in FIG. 4, timing signal A enables AND gate 60 with respect to the range counts $r$ as applied to terminal 52. Thus, range counts $r_a$ received during sampling period $a$ are passed through AND gate 60 and OR gate 70 to up-count pulse counter 86.

Timing signal A also enables AND gate 94 with respect to the vernier pulses V as applied to terminal 88. The vernier pulses $V_a$ received during sampling period $a$ are thus passed through AND gate 94 to up-count pulse counter 104.

Pulse counter 104, here having a binary coded decimal (BCD) format produces a first output signal (vernier up-count) when it carries, i.e. when its contents change in a positive direction from the counter highest state, here from 9 to 0. A second output signal (vernier down count) is produced when counter 104 borrows, i.e. its contents change in a negative direction from 0 to the counters highest state, here from 0 to 9.

Pulse counter 104 is down counted by each of the divider means output signals D. Each of the timing signals A, B and C, through OR gate 126, enables AND gate 118 with respect to the delayed range counts $r'$. Divider 112, therefore, produces one output signal (D), for every group of N delayed range counts $r'$ thereby during each of the sampling periods, where N is the constant defined in equation (9) above. Thus, the output signals D of divider 112, pass through OR gate 108 to down-count pulse counter 104.

FIG. 5 shows the time relationship of the gated range counts $r$, vernier counts $v$ and delayed gated range counts $r'$. The vernier pulses $v$ are produced subsequent to the gated range counts $r$, and the delay produced by delay means 122 is sufficient to make the delayed gated range counts $r'$ subsequent to the last vernier pulse but still within the sample time frame, that is, before the next interrogation, as manifested by the next $T_o$ pulse.

Thus, for those samples occurring within sampling period $a$, the gated range counts $r$, associated with a particular sample, will up-count pulse counter 86. The vernier pulses of that sample will then up-count pulse counter 104. If a sufficient number of vernier pulses are received, pulse counter 104 will accordingly generate vernier up-counts which, in turn, are passed through OR gate 70 to up-count pulse counter 86.

Pulse counter 104 will subsequently be down-counted by the divider means output signals D, and if down-counted sufficiently will accordingly generate vernier down-counts, which are passed through OR gate 78 to down-count pulse counter 86.

AND gate 118 is enabled by timing signal B, thus, pulse counter 104 will be further down-counted by the divider means output signals D during sampling period $b$.

Similarly, timing signal C enables AND gate 62 with respect to the range counts $r$ as applied to terminal 52 and AND gate 96 with respect to the vernier pulses V as applied to terminal 88. Thus, the range counts $r$ received during sampling period $c$, pass through AND gate 62 and OR gate 78 to down-count pulse counter 86 and the vernier pulses V received during period C pass through AND gate 96 and OR gate 108 to down-count pulse counter 104. Counter 104 is further down counted by the divider output signals D received during period C and accordingly generates vernier down counts, as described above, to down-count pulse counter 86.

Thus, counter 104, in effect, serially calculates the difference between the number of vernier pulses received during sampling period $a$ and the sum of the N-divider output pulses D and the number of vernier pulses received during sampling period $c$, divides the difference by 10, and generates output signals to appropriately upcount or downcount pulse counter 86.

The contents of pulse counter 86, therefore, are representative of the left side of equation (11). Hence, positive contents indicate that Tau is less than the preset threshold value $\tau_{crit}$, and that a warning should be generated. Pulse counter 86, therefore, accordingly generates appropriate output signals, applied to utilization means 31.

It should be noted that counter 104 serves a dual purpose. First, it divides the difference between $v_a - v_c$ by 10, thereby converting the vernier counts into terms of $r$, i.e., $10v = 1r$. And secondly, counter 104 is utilized as a second stage of divider 112, thus explaining the factor of 10 in the denominator of equation 9. It should be apparent that the above stated functions can be achieved by separate means. Divider 112 would thus be made to divide by $N = K_1 \tau_{crit}/K_2$ and apply to output signal D directly to a third input of OR gate 78. OR gate 108 could thus be eliminated and AND gate 96 would apply its output signals $V_c$ directly to counter 104.

A fixed range offset, as illustrated in FIG. 3, may be incorporated into the present embodiment by presetting counters 104 and 86 with the specified fixed range offset $r_o$ in accordance with the start pulse at terminal 51.

It is apparent from the foregoing description that the present invention provides a particularly advantageous logic circuit for comparing the ratio of the average value of a variable in time to the average value of its time derivative to a specified predetermined constant. It will be understood that the above description is of preferred embodiment of the present invention, and that the invention is not limited to the specific forms shown. Modifications may be made in the design and arrangement of the elements without departing from the spirit of the invention.

Thus, it should be appreciated by those skilled in the art that the present invention is not limited for use in a digital tracking system as just described, but may be utilized to generate a warning or appropriate signal in accordance with a comparison of the ratio of any variable in time to its time derivative with a selected threshold value. Thus for general application, input signals representative of the variable in time are applied to terminal 18 (FIG. 1). The value for the constant N is determined by the conversion factors relating the representative input signals to the physical variable and its time derivative and the chosen or desired threshold value.

It should be further apparent that any plurality of logical timing signals indicative of a plurality of time periods that define a specified time interval may be used. Thus, logical signals indicative of any first time period can be utilized in the stead of timing signal A and time signal C could instead be a logical signal indicative of any time period subsequent to the first. OR gate 48 receives at its respective input terminals the logical signals indicative of each of the time periods defining the time interval.

What is claimed is:

1. In a digital tracker for tracking reply signals from a remote station corresponding to interrogation signals from an interrogating station, including clock means for generating range counts, each count representative of a set distance, and range count gating means, responsive to said range counts, for providing interrogation reply gated range count output signals only during the intervals between the transmission of said interrogation signals and the reception of said corresponding replies, a system for generating a warning when the time to a projected impact between said interrogation and remote stations exceeds a predetermined value comprising:

a. timing means for generating a plurality of timing signals each of which being, respectively, indicative of contiguous time periods;
 b. input means for receiving input signals representative of a time varying parameter;
 c. divider means receptive of said representative input signals for generating one output signal for every N representative input signals received where N equals a specified constant;
 d. accumulator means receptive of said representative input signals, said divider means output signals and said timing signals for providing an output signal when the number of representative input signals received during a first one of said time periods is greater than the sum of the number of divider means output signals and the number of representative input signals received during a specified one of said time periods subsequent to said first period.

2. The combination of claim 1 wherein said accumulator means comprises:

a. first gate means receptive of said representative input signals and the timing signal indicative of said first time period for producing an output signal for each representative input signal received during the first period;
 b. second gate means receptive of said representative input signals and the timing signal indicative of said subsequent time period for producing an output signal for each representative input signal received during the subsequent period;
 c. third gate means, having as input signals the output signals of said divider means and the output signals of said second gate means, for producing an output signal in response to any of said input signals applied thereto; and
 d. pulse counter means, having an increment input means coupled to said first gate means and responsive to the output signals of said first gate means and a decrement input means coupled to said third gate means and responsive to the output signals of said third gate means, for adding and subtracting, respectively, one to a total when an input signal is received.

3. The combination of claim 1 further comprising utilization means coupled to said accumulator means and responsive to the output signal of said accumulator means, for generating a warning indicia.

4. In combination:

a. timing means for generating a plurality of timing signals each of which being respectively indicative of contiguous time periods;
 b. input means for receiving input signals representative of a time varying parameters;
 c. divider means receptive of said representative input signals for producing one output signal for every N representative input signals received where N equals a predetermined specified constant;
 d. accumulator means receptive of said representative input signals, said divider means output signals and said timing signals for providing an output signal when the number of representative input signals received during a first one of said time periods is greater than the sum of the number of divider means output signals and the number of representative input signals received during a specified one of said time periods subsequent to said first period.

5. The combination of claim 1 further comprising:

a. second input means for receiving vernier signals, said vernier signals being related to said representative input signals; and
 b. vernier processing means receptive of said vernier signals and said timing signals, for:
  establishing the number of said vernier signals received during said first period, and generating one first output signal for every M of such first period vernier signals;
  retaining a remainder count, R, of said first period vernier signals, where said number of said first period counts is not an integral multiple of M, where M is a constant conversation factor relating said vernier signals to said representative input signals; and
  establishing the number of said vernier signals receiver during said subsequent time period, and generating one second output signal, for the first M+R of such subsequent period vernier signals received and thereafter generating one second output signal for every M of such subsequent period vernier signals received.

6. The combination of claim 5, wherein said vernier processing means comprises:

a. first gate means, receptive of said vernier signals and the timing signal indicative of said first time period, for producing an output signal for each vernier signal received during said first period;
 b. second gate means, receptive of said vernier signal and the timing signal indicative of said subsequent time period, for producing an output signal for each vernier signal received during the subsequent period;
 c. pulse counter means having an increment input means responsive to the output signal of said first gate and an decrement input means responsive to the output signal of said second gate means for adding and subtracting, respectively, one to a total when an input signal is received;
 d. said pulse counter means providing a first output signal upon transition of said total in positive direction from a specified value and a second output signal upon transition of said total in a negative direction to said specified value.

7. A combination comprising:

a. timing means for generating a plurality of timing signals each of which being respectively indicative of contiguous time periods;
 b. first input means for receiving input signals representative of a time varying parameter;

c. divider means receptive of said input signals for generating one output signal for every N representative input signals where N equals a specified constant;

d. second input means for receiving vernier signals; said vernier signals being related to said representative input signals;

e. vernier processing means, receptive of said vernier signals, said divider means output signals and said timing signals, for establishing a total comprising the difference between the divider means output signals summed with the number of said vernier signals received during a specified one of said time periods subsequent to said first time period and the number of said vernier signals received during a first specified one of said time periods;

and generating a first output signal upon transition of said total in a position direction from a specified value and;

generating a second output signal upon transition of said total in a negative direction to said specified value;

f. accumulator means receptive of said representative input signals, said first and second vernier means output signals, said divider means output signals, and said timing signals, for producing an output signal when the sum of the number of representative input signals received during said subsequent period, the number of said vernier processing means second output signals and the number of said divider means output signals are less than the sum of the number of said representative input signals received during said first period and the number of said vernier processing means first output signals.

8. The combination of claim 7, wherein said vernier processing means comprises:

a. first gate means, receptive of said vernier signals and the timing signal indicative of said first time period, for producing an output signal for each vernier signal received during said first period;

b. second gate means, receptive of said vernier signal and the timing signal indicative of said subsequent time period, for producing an output signal for each vernier signal received during the subsequent period;

c. third gate means having its input signals said divider means output signals and the output signals of said second gate means for producing an output signal in response to any input signal;

d. pulse counter means having an increment input means responsive to the output signal of said first gate and an decrement input means responsive to the output signal of said third gate means for adding and subtracting, respectively, one to a total when an input signal is received.

said pulse counter means providing a first output signal upon transition of said total in positive direction from a specified value and a second output signal upon transition of said total in a negative direction to said specified value.

9. The apparatus of claim 5 wherein said accumulator means comprises:

a. first gate means, receptive of said representative input signals and the timing signal indicative of said first period, for producing an output signal for each representative input signal received during said first period;

b. second gate means receptive of said representative input signals and the timing signal indicative of said subsequent period for producing an output signal for each representative input signal received during said subsequent period;

c. third gate means having as input signals the output signals of said first gate means and said vernier means first output signals, for producing an output signal in response to any input signal;

d. fourth gate means having as input signals the output signal of signals of said second gate means and said vernier means second output signals, for producing an output signal in response to any input signal;

e. pulse counter means having an increment input means responsive to the output signals of said third gate means and a decrement input means responsive to the output signals of said fourth gate means for adding and subtracting, respectively, one to a total when an input signal is received.

10. The system of claim 1 further comprising: range offset means for presetting said accumulator means, whereby warnings can be generated for a projected impact with slow moving proximate remote stations.

11. The system of claim 9, further comprising: range offset means for presetting said accumulator means, whereby warnings can be generated for a projected impact with slow moving proximate remote stations.

* * * * *